United States Patent

McNeill

[15] 3,639,731
[45] Feb. 1, 1972

[54] ANALYSIS SYSTEM FOR MOBILE EQUIPMENT

[72] Inventor: Jon J. McNeill, Redwood City, Calif.
[73] Assignee: Textron Inc., Belmont, Calif.
[22] Filed: Dec. 4, 1969
[21] Appl. No.: 882,206

[52] U.S. Cl. ............... 235/61.11 E, 246/169, 340/146.3 K, 235/150.2, 340/27
[51] Int. Cl. .......................................................... B61l 1/00
[58] Field of Search ................ 340/146.3 K, 27, 32, 47, 66, 340/139, 416, 224; 246/2, 167, 169, 192; 235/150.2

[56] References Cited

UNITED STATES PATENTS

| 2,291,610 | 8/1942 | Crane | 340/27 |
| 2,934,752 | 4/1960 | Arrasmith | 340/27 |
| 3,225,177 | 12/1965 | Stites et al. | 340/146.3 |
| 3,287,965 | 11/1966 | Brahm et al. | 235/150.2 |
| 3,454,758 | 7/1969 | Gallagher | 246/169 |

Primary Examiner—Thomas A. Robinson
Attorney—Gregg & Hendricson

[57] ABSTRACT

An analysis and indicating equipment for mobile equipment such as locomotives or the like providing visual indications of equipment conditions and including exterior indication for scanning and remote readout at distant locations.

3 Claims, 6 Drawing Figures

INVENTOR
JON J. MCNEILL
BY Gregg & Hendricson
ATTORNEYS

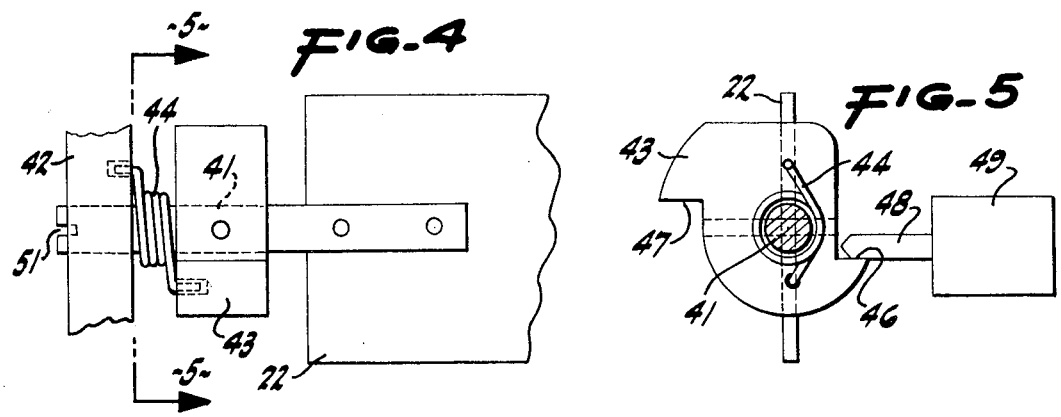
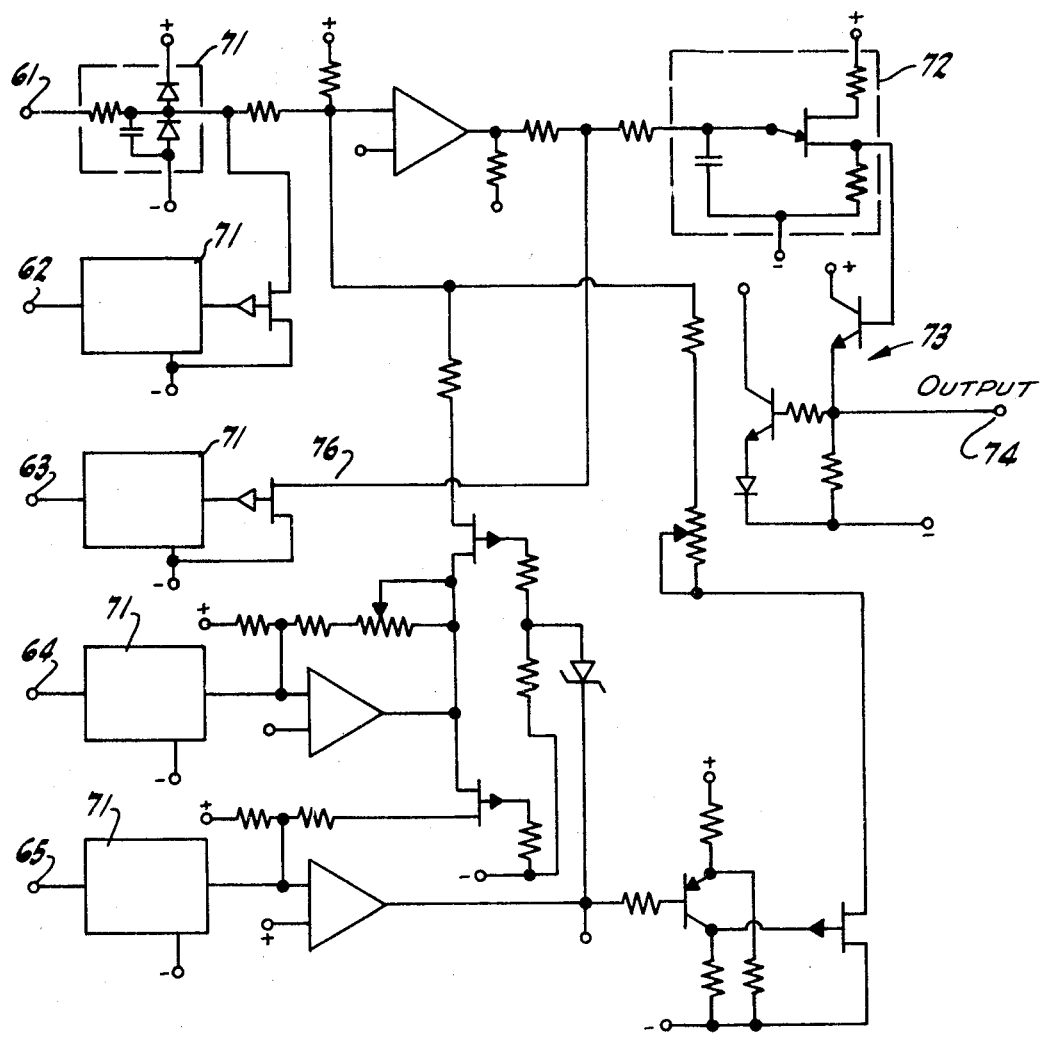

ANALYSIS SYSTEM FOR MOBILE EQUIPMENT

BACKGROUND OF INVENTION

Although the present invention is applicable to a variety of different types of equipment, it is hereinafter referenced to the field of rolling stock or units adapted to move on rails such as locomotives; railroad cars, rapid transit equipment or the like. In the maintenance and repair of rolling stock such as locomotives, it is conventional for railroad personnel to observe and note malfunctions of the rolling stock for reference to repair personnel at maintenance yards. In addition there are naturally made periodic checks of more complex equipment at maintenance yards with the view toward preventive maintenance and repair of faulty equipment.

Despite planned maintenance and careful observation of operating characteristics of railroad equipment, there is yet encountered a variety of difficulties which limit efficient operation of railroads, rapid transit equipment and the like. Thus, for example, it is highly important to minimize the periods of inoperability of locomotives occasioned by the necessity of maintenance and repair. Initiation of analysis at maintenance yards results in the prolongation of maintenance time, and, furthermore, it is oftentimes necessary to "road test" rolling stock in order to obtain full information as to possible malfunctions. A further and possibly even more serious difficulty is to be found in the failure or malfunction of essential equipment during vital use thereof. Thus, for example, a locomotive in use drawing a train along railroad tracks cannot be readily replaced should it fail in service. In the same vein, failure of a refrigeration unit in a refrigeration car carrying perishable goods, for example, may well result in damage or destruction of valuable cargo. These problems and others have long been recognized and certain relatively makeshift solutions thereto have been advanced and are, in fact, in practice. Thus, in the instance of refrigeration cars, it is conventional for refrigeration trains to be periodically sidetracked for individual physical inspection of each car prior to continuation of travel. This necessitates a substantial period of inactivity of the train and, furthermore, raises the problem of how to cope with a faulty car found in the course of such an inspection. Again it is common to merely remove such a car from the train unless very rapid repairs may be made thereon. In order to preclude the problems of a stranded train through locomotive failure on the other hand, it is conventional to extensively inspect and maintain locomotives at relatively frequent intervals and this has the obvious drawback of increasing the cost of railroad operations.

There has been developed at least one locomotive analysis system which minimizes the time required for complete inspection of railroad locomotive to pinpoint areas of poor performance or malfunction and the present invention may be considered an extension thereof.

SUMMARY OF INVENTION

The present invention provides an analysis system of substantially any desired degree of complexity for utilization with mobile equipment such as a railroad locomotive, refrigeration car or rapid transit vehicle, for the purpose of producing indications of operating characteristics thereof. While it has become common in a variety of fields such as that of the automotive field to incorporate various types of warning indicators on motor vehicles, the present invention proceeds much further in the production of indicia of operating characteristics of a wide variety. While it is possible for the present invention to incorporate means for indicating simple conditions such as temperature or the like, it is primarily provided hereby that the system shall produce indications of complex characteristics such as horsepower output, dynamic braking, wheel slippage of driven wheels, forward and backward transition and the like.

In the accomplishment of producing complex condition indications, the present invention incorporates a modular computing unit, preferably simply comprised as a plurality of individually interchangeable circuit boards receiving test signals from a plurality of locations in the equipment under analysis. For example, with respect to a locomotive, the test signals may be obtained from appropriate locations in the electrical control and protective circuitry thereof. These signals are properly combined and operated upon in the modular computing unit to produce separate signals representative of certain operating characteristics of the equipment under analysis.

The computed characteristics in the form of electrical signals may be applied to a visual indicating unit located upon the moving or mobile vehicle for information of an operator thereof, for example. While the foregoing is advantageous, the present invention further provides for the application of signals representing calculated operating characteristics to an externally located indicator or indicating means disposed for reading from the exterior of the vehicle. These indicating means are preferably of the visual type, although not necessarily so limited, and are adapted to be read by scanning means prepositioned at fixed locations relative to a track upon which the analyzed vehicle travels. Such scanning means then transmit information displayed by the indicating means to some remote locations, such as, for example, a maintenance yard or the like so that appropriate personnel thereat are apprized of vehicle condition prior to arrival of such vehicle thereat. This will be seen to provide a material advantage in the maintenance of rolling rock, first in the provision of precise information as to characteristics of the equipment in operation, and secondly in the minimization of time required for repair or corrective action as may be required.

A further point of particular note with respect to the advance in remote identification of moving vehicle malfunctions is the capability of the present invention for cooperation with existing telemetering equipment employed in railroads and the like. There has been developed and approved for use a system incorporating a visual scanner together with a visual identification system for rolling stock of railroads whereby individual vehicles passing predetermined points on a railroad track are identified by code markings carried thereon and such identification is instantaneously transmitted to a central station for dissemination of the information to separate offices and the like. This system is now in use at least in the United States for counting and locating railroad cars belonging to the various different railroad companies with the expectation that ultimate full use of the system will provide a substantially instantaneous identification at any time of all railroad cars of each railroad. The exterior indicating means of the present system is adapted for utilization with the aforementioned railroad car identification system and preferably incorporates the same general limitations as to area and type of display insofar as the capabilities of the scanner are concerned. It is, however, to be appreciated that a variety of different types of scanners may be employed, even to the extent of a relatively conventional television camera mounted in position to "read" information displayed by the exterior indicating means of the present analysis system.

DESCRIPTION OF FIGURES

The present invention is illustrated as to a single preferred embodiment in the accompanying drawings, wherein:

FIG. 4 is a partial view of mounting and control of an individual indicating vane of the display unit of the present invention;

FIG. 5 is a sectional view taken in the plane 5—5 of FIG. 4; and

FIG. 6 is a schematic circuit diagram of one portion of the modular computing unit of the present invention.

DESCRIPTION OF PREFERRED EMBODIMENT

Figure 1:
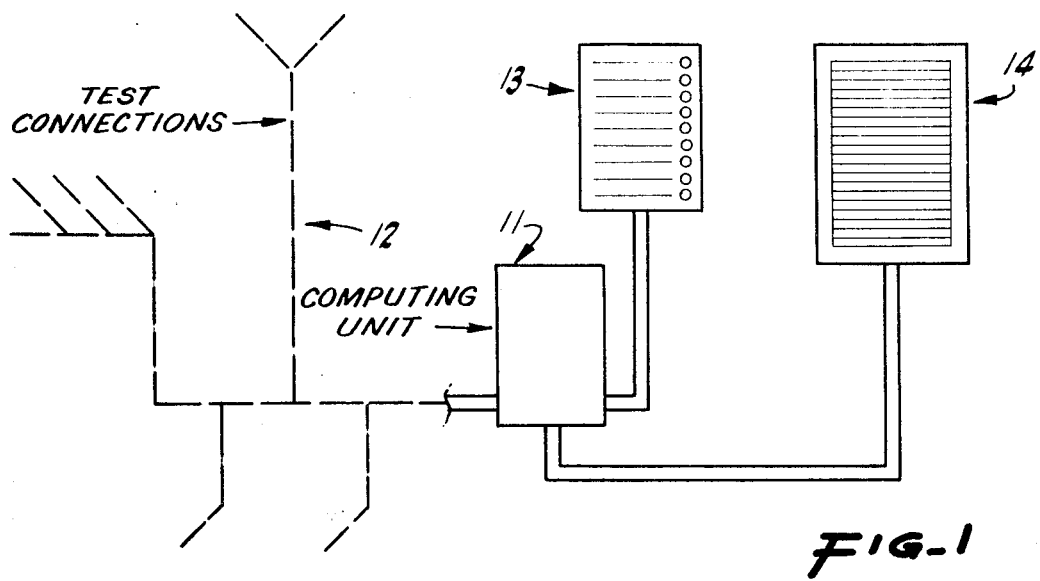
FIG. 1 is a schematic illustration of the system of this invention.
Figure 2:
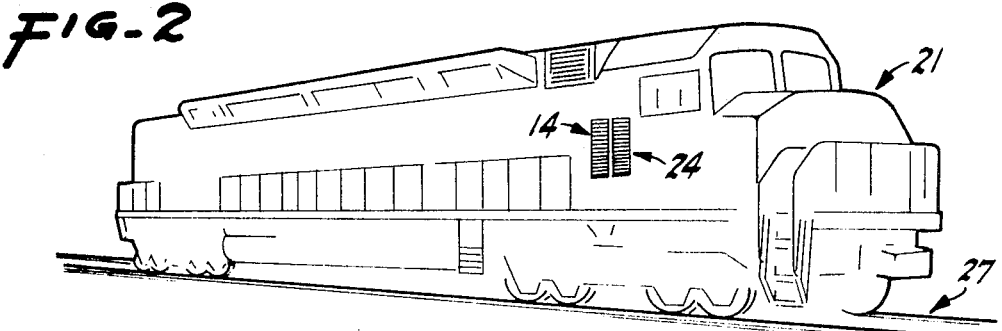
FIG. 2 is a projected illustration of a railroad locomotive carrying the external display unit of the present invention.
Figure 3:
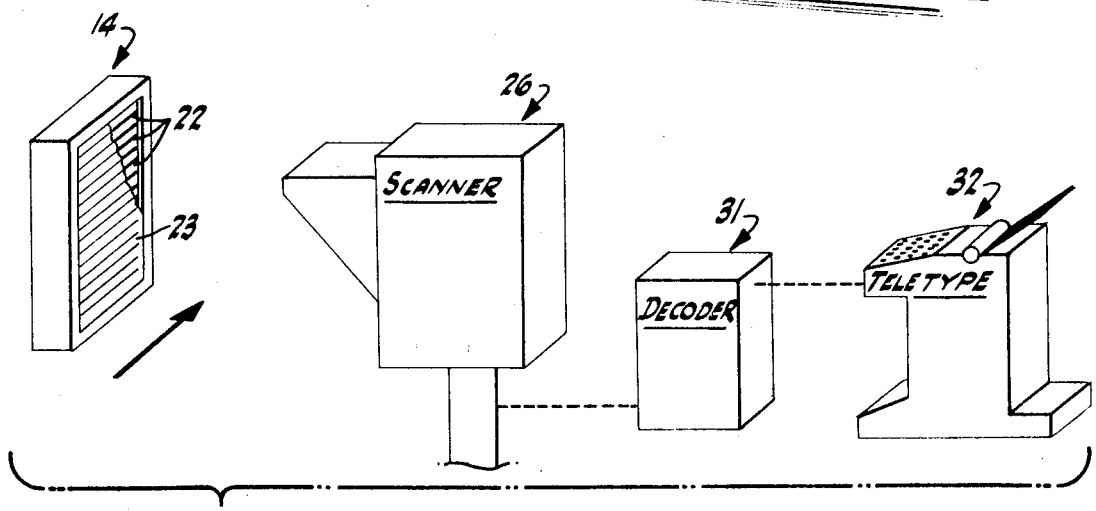
FIG. 3 is a pictorial representation of exterior reading, transmittal and recording of display unit information in accordance with the present invention.

Considering first the illustration of FIGS. 1 to 3 of the drawings, it is noted that the present invention generally comprises a modular computing unit 11 having test connections 12 connected thereto and producing output signals which may be applied to a locally mounted display or indicating board 13 and/or to an externally disposed display means 14. The present invention provides for the display of calculated characteristic indications with basic information being provided through the test connectors 12 connected at appropriate locations within a locomotive, for example, to control and protective circuitry thereof. While it is possible to display indications of malfunction insofar as simple parameters such as temperature or the like is concerned, the present invention proceeds much further in producing a display of the state of more complex characteristics such as, for example, loading, dynamic brake, wheel slip, ground relay action, forward transition and backward transition. It is not intended herein to comment extensively on operational characteristics or physical layout of railroad locomotives, for example, for the field thereof is well known. Furthermore, the present invention is in no way limited to utilization with railroad locomotives and is, in fact, employed in connection with railroad refrigeration cars as well as electrically powered rapid transit vehicles. However, merely for the purpose of explanation, it is convenient to reference the invention to a railroad locomotive and to provide as examples characteristics of same that may be analyzed and displayed by the present invention. The foregoing listing is exemplary of diesel electric locomotive characteristics that may be analyzed and displayed by the present invention.

Considering the invention somewhat further and referring to FIGS. 2 and 3, it is noted that the external display means 14 is adapted to be mounted on the side of a locomotive 21. This display means 14 includes a plurality of rectangular strips or vanes 22 extending horizontally and disposed one above the other behind a window 23 for viewing from the exterior of a vehicle carrying the display means. In the system illustrated the display means operates by means of a color code with the vanes 22 being typically mounted to change position in response to signals point received from the modular computing unit 11 so as to display a different color upon receipt of a predetermined signal applicable to an individual vane. The physical dimensions of the display means 14 and the vanes 22 thereof may be made to conform to the identification chart or label employed in the automatic car identification system in use by railroads in the United States. Such a label, indicated at 24 of FIG. 2, is normally mounted on the side of each piece of rolling stock or a railroad at a predetermined height for viewing by a scanner 26 located at a predetermined point adjacent railroad track 27 along which wheeled vehicles are adapted to move.

The characteristics analyzed by the present invention are individually displayed as to certain limitations thereof by the display means 14 with such display then being viewed by the scanner 26 as the locomotive, for example, passes the scanner. The optically coded information of the display means is transduced into electrical analog signals by the scanner and these signals may be applied to a decoder or the like 31 that in turn transmits the information to some type of readout device or system such as, for example, the illustrated teletypewriter 32. It is to be appreciated that the readout unit 32 is preferably located at some control or maintenance point whereat the various conditions of the locomotive, for example, reported by the display means are of interest. A practical application of the present invention would place the scanner 26 beside a railroad track at some distance ahead of the maintenance yard so that as the locomotive approached the yard, various operating conditions of the locomotive would be read by the scanner 26 and reproduced at the readout means 32 within the yard before the locomotive arrived. This then would enable maintenance or repair crews, for example, to prepare for such work as may be required by the indications. It is to be noted that the scanner 26 reads not only the display means 14 but also the label or identifying chart 24, mounted on the exterior of the locomotive, so that the readout means 32 identifies the particular vehicle having the analysis read out. It will be appreciated that the system of the present invention is highly advantageous in analyzing characteristics of operating vehicles and providing results of such analysis to some remote point such as, for example, a maintenance yard or the like. It not only provides precise information as to operating characteristics of a locomotive, for example, under true operating conditions, but also provides this information in advance of the arrival of the locomotive at some point where action may be taken to correct malfunctions or the like. Maintenance is consequently facilitated and expedited.

Considering further the display unit 14 of the present invention, reference is made to FIGS. 4 and 5 of the drawings wherein portions of display unit operating elements are illustrated. As noted above, an external display unit 14 is provided with a plurality of frontal elements having separate or successive surfaces of different or varying color for example, together with means for moving such surfaces to vary the exposed color in response to signals from the modular computing unit 11. A single blade 22 is shown in FIGS. 4 and 5 as being mounted upon short end shafts 41 journaled in upright end members 42 which may, for example, form part of the structure of the display means. The blade 22 will thus be seen to be capable of rotation in a horizontal plane about the axis of the end shafts 41 and such rotation is controlled by means responsive to the input signals from the modular computing unit 11. In the simple embodiment shown, a cam 43 is affixed to the shaft 41 at the end of the blade 22 and a spring 44 is mounted on the shaft with an arm thereof extending into engagement with the cam for urging the cam to rotate in a counter clockwise direction as viewed in FIG. 5. Cam 43 is provided with first and second cam surfaces 46 and 47 in the form of projections extending outwardly so as to be in position for engagement by a plunger 48 of a solenoid 49.

In the cam position illustrated in FIG. 5, the spring 43 is urging the cam to rotate in a counterclockwise direction but such rotation is prevented by the solenoid plunger 48 engaging the cam surface 46. Upon application of electrical energization to the solenoid 49 the plunger 48 thereof is retracted a short distance sufficient to move out of contact with the cam surface 46. With the solenoid plunger retracted to part contact with cam surface 46, the spring 43 will rotate the cam 180° to the point where the second cam surface 47 engages the retracted solenoid plunger. The blade 22 will thus be seen to be rotated 180° so as to expose the opposite surface thereof through the window of the display means. While it is, of course, possible to provide for automatically resetting the display means, the illustrated embodiment merely provides a slot 51 in the end of the shaft 41 by means of which the shaft may be manually rotated back to original position.

It is to be appreciated that a separate solenoid is provided for each blade of the display means and each of the solenoids are provided with signals resulting from computations made with predetermined test signals. Thus, for example, malfunction or faulty operation of the dynamic brakes is determined by the modular computing unit 11 from various input test signals such that an output signal is applied to the solenoid controlling the particular blade indicating dynamic brake condition. This signal rotates the bland 180°. The opposite sides of the blades are colored differently as, for example, by providing one side of each of the blades as a dead black and the opposite side as a fluorescent red. With the scanner 26 being responsive to color received, it will be appreciated then that in a first position of the blades of the display means 14 substantially no light will be reflected therefrom so the scanner will receive no signal while 180° rotation of any one or more of the display means blades will cause the scanner to receive red line signals at the locations of the particular rotated blades as the display means moves past the scanner.

It is to be appreciated that the display means of the present system may be comprised in a variety of manners and the embodiment thereof illustrated and described above is only exemplary. Thus, for example, individual displays, identified as blades 22, may be formed with triangular cross sections, for example, with a different color on each face of the triangle. It is also possible to employ cylinders in place of the blades with different colors about the cylinder diameter and appropriate signal responsive means rotating the cylinders.

The modular calculating unit 11 of the present system receives a plurality of input signals or test signals from various points in the electrical control and protective circuitry of a locomotive, for example. These test signals are employed to produce an indication of the condition of some complex characteristic such as, for example, the condition of the dynamic brakes of the locomotive. In this respect reference is made to FIG. 6 of the drawing setting forth a schematic illustration of electrical circuitry as may be employed upon one module of the computing unit 11 and adapted to produce an output signal upon serious malfunction of the dynamic brakes of a locomotive. It is not intended to indicate by the illustration of FIG. 6 that the circuitry thereof is basic to the invention but instead merely to show a possible computing component receiving a plurality of input test signals and producing a signal fault indicating output. As shown in FIG. 6, there may be employed five input terminals indicted at 61, 62, 63, 64 and 65. Without attempting to incorporate extensive explanation of the dynamic braking system of a diesel electric locomotive, it is briefly noted that the system is operated by the engineer by means of a selector handle which switches the locomotive from power mode to brake mode and by means of a second handle which is continuously variable to control the amount of braking. In determining operation or condition of the dynamic brakes there is employed one test signal from train line 21T which is one of the 27 wires normally provided on a locomotive for the purpose of controlling a multiplicity of locomotives from one cab thereof. Train line 21T becomes energized with a predetermined positive voltage as of the order of +74 volts when the selector handle is moved from power to brake mode and this signal is applied to terminal 63. Train line 24T has a varying potential upon it corresponding to the movement of the second handle noted above varying the amount of braking and the potential on this line may vary between 0 and +74 volts, for example. A test signal from line 24T is applied to terminal 64.

It is to be noted that the actual amount of braking effort exerted is not only a function of the voltage on line 24T but is also dependent upon the speed of the locomotive and, furthermore, that in the dynamic braking mode the braking power is dissipated as heat in the dynamic braking grid resistors. These resistors have a limited capacity and consequently within the electrical control system of a locomotive there is provided a dynamic braking relay, commonly termed DBR, which limits the amount of current flowing to the braking grids, normally to a value less than 700 amperes. The action of this relay DBR is sensed at an input signal point RCP-6 and the voltage thereof applied to the terminal 65. When the DBR relay is deenergized the grid current is in the safe range and the voltage at RCP-6 is equal to or greater than one-half the voltage at 24T, i.e., terminal 64. When the relay DBR is energized, meaning that the engineer is calling for more braking current than the grid resistors can absorb, the voltage at RCP-6 falls below one-half the voltage at 24T.

Additionally there is employed as an input at terminal 61 a feedback voltage FB monitoring the generator output which in braking mode is employed to provide field excitation of the traction motors. This voltage FB should be equal to or more than one-half the voltage 24T appearing at terminal 64 as long as relay DBR is not energized. However, when DBR is energized the voltage feedback FB falls to some nominal value normally in the range of 2 to 4 volts and remains at this value. One additional input signal is provided to the circuit of FIG. 6 and this is generally termed IS-E which is a strategic point in the locomotive control circuit and it is normally at a +74 volts when the locomotive is in operation. When the selector handle is moved from the power mode to the dynamic brake mode the voltage at IS-E normally drops to zero and then returns to about +74 volts if the dynamic braking system is operating properly. On the other hand, if the dynamic brake relay does not pick up then the voltage at IS-E remains at zero. It is to be further noted that in the protective circuitry of the locomotive there is normally provided an overcurrent protective relay DWR which operates in the event that relay DBR fails to regulate the maximum current on the grids and this overcurrent protective relay removes the voltage at point IS-E. It will thus be seen that in the baking mode when terminal 63 is energized by test signal at 21T and the voltage at IS-E reduces to zero, there is a failure in the dynamic brake circuitry.

Referring further to FIG. 6 it will be seen that immediately following each of the input terminals there is provided a transient suppression circuit indicated by the numeral 71 which may be identical at each terminal. A timing circuit 72 provides a time delay in the passage of signals from the circuit to the input through an amplifier 73 so that a fault condition must continue for some predetermined period of time such as, for example, 45 seconds before there will be produced a fault signal at the output 74.

In brief, the circuit of FIG. 6 becomes operable upon application of the 21T input signal at terminal 63 indicating that dynamic braking is being called for and this signal operates to cut off the FET 76 and thus unground the input to the delay circuit 72. Without attempting to enter into a description of details of circuitry it is only briefly noted that the circuit of FIG. 6 is arranged to pass a signal to the output terminal 74 in response to certain combinations of particular conditions at the input terminal 61 to 65.

With the DBR relay deenergized, the voltage at terminal 65 is greater than one-half the value of the voltage at terminal 64 and if at the same time a positive voltage appears at terminal 63, a first mode of operation results. In the first mode an output signal from the circuit is produced if the voltage at terminal 62 goes to zero indicating either that the brake relay has not picked up or the brake warning relay has picked up. Also in the first mode, if the voltage at terminal 61 (FB) falls below one-half the voltage at terminal 64 (24T) then an output signal is produced indicating that a serious fault exists.

In the second mode of operation, wherein the voltage at terminal 65 is less than one-half the voltage at terminal 64 and a voltage is present at terminal 63, an output signal is produced for a zero voltage at terminal 62. Also, an output signal is produced if the input voltage to terminal 61 falls below a present minimum as, for example, 3 volts. This latter condition is indicative of insufficient voltage applied to the generator.

It will be appreciated from the foregoing brief description of one module of the computing 11 that the present invention provides for analysis of a system such as, for example, that of a locomotive for the production of fault signals or signals indicative of improper operation. The present invention provides for the application of these signals to the internal indicator 13 whereby an engineer, for example, is immediately apprised of faulty operation but also the present invention provides for the application of these signals to the external display unit 14. In distinction to conventional analysis systems, the present invention operates upon a moving vehicle to produce indications of faulty operation which are externally displayed for reading by a stationary scanner or the like as the vehicle passes same. Not only do display means or indicating means of the present invention provide analysis indications of complex characteristics as contrasted to mere straightforward indications of single parameters but additionally this displayed information is herein made available exteriorly of the moving vehicle so as to be read and forwarded to appropriate action stations remotely located from the point of reading. It is to be particularly noted that the invention is in no way limited to operation upon railroad locomotives and may in fact be applied to a variety of different types of vehicles adapted to move along tracks or move in other manners past one or more fixed points whereat the displayed analysis information may be read. It is also noted that alternative types of information display may be employed exteriorly of the vehicle. Thus, for example, a series of movable projections may be utilized to display faulty operation signals with a manually engageable reader. However, the visual display means identified above is quite advantageous particularly in conjunction with the scanner of the system so as to be capable of interfacing with the already existing ACT system for rolling stock identification on railroads There has been described above a system for analyzing complex characteristics of a moving vehicle and for displaying the results of such analysis in a manner capable of providing these results to remote locations. Variations in the system described are of course possible and thus it is not intended to limit the invention to the precise terms of description or details of illustration.

I claim:

1. An analysis system for mobile equipment comprising
a computing unit mounted upon a vehicle,
test connections between said computing unit and selected points in circuitry of the vehicle for applying circuit voltages to said unit during vehicle travel,
said computing unit producing electrical signals representing the condition of complex vehicle characteristics calculated from said circuit voltages, and
a display unit disposed on said vehicle and directed exteriorly thereof, said display unit including a plurality of separate movable elements with each element having at least two surfaces of different colors, said display unit further including operating means connected to said computing unit for actuation by electrical signals therefrom and engaging separate elements of said display for movement of the elements to display different colored surfaces thereof as an external display of the condition of said complex vehicle characteristics.

2. An analysis system for mobile equipment comprising
a computing unit mounted upon a vehicle,
test connections between said computing unit and selected points in circuitry of the vehicle for applying circuit voltages to said unit during vehicle travel,
visual indicating means connected to said computing unit for receiving signals therefrom and indicating the condition of complex vehicle characteristics,
a display unit disposed on said vehicle and directed exteriorly thereof, said unit including a plurality of separate indicators individually operated by signals from said computing unit for displaying indications of the condition of complex vehicle characteristics exteriorly of said vehicle during movement of the vehicle,
scanning means disposed without said vehicle to view said display means,
readout means disposed remotely from said scanning means, and
means transmitting the output of said scanning means to said readout means for remotely indicating complex vehicle characteristics of the moving vehicle.

3. An analysis system for mobile equipment comprising
visual display means having a plurality of indicators and mounted upon a vehicle to direct said indicators exteriorly thereof,
computing means connected to predetermined points of a vehicle for receiving signals representing simple vehicle conditions and producing output signals that are a function of combinations of input signals as representations of the condition of complex characteristics of the moving vehicle,
means connecting said computed output signals to said display means for selectively actuating separate indicators thereof,
reading means disposed adjacent a path of the vehicle for reading said display means and producing signals corresponding to indicator conditions, and
readout means connected to receive signals from said reading means and producing a record of the condition of complex characteristics of the moving vehicle.

* * * * *